3,415,787
ORGANO-ANTIMONY OXIDES AND SULFIDES
AS POLYCONDENSATION CATALYSTS
Otto K. Carlson, Marcus Hook, and John A. Price,
Swarthmore, Pa., assignors to FMC Corporation,
Philadelphia, Pa., a corporation of Delaware
No Drawing. Filed Nov. 7, 1966, Ser. No. 592,342
9 Claims. (Cl. 260—75)

ABSTRACT OF THE DISCLOSURE

Process for preparing polyethylene terephthalate comprising carrying out an ester-interchange reaction between ethylene glycol and dimethyl terephthalate or carrying out a direct esterification reaction between ethylene glycol and terephthalic acid and polycondensing the reaction product thereof in the presence of a polycondensation catalyst having the formula

in which X represents an oxygen atom or a sulfur atom and $R_1$, $R_2$, and $R_3$ represent radicals selected from the group consisting of lower alkyl, aryl, alkaryl, and aralkyl.

---

This invention relates to an improved method for the preparation of linear polyesters. More particularly, it relates to an improved polycondensation catalyst for use in the manufacture of highly polymeric linear polyesters.

It is known that linear polyethylene terephthalate can be prepared by a direct esterification reaction method or by an ester-interchange reaction method. Both of these methods involve two-stage processes. In the first stage of the direct esterification method, ethylene glycol is reacted with terephthalic acid in the presence of what is known as a catalytic additive or ether inhibitor so as to form an ester condensation product. Whereas in the ester-interchange or transesterification method, ethylene glycol is reacted with dimethyl terephthalate in the presence of an ester-interchange catalyst so as to form the corresponding transesterified product. In the second stage of both of the above methods, the product of the transesterification reaction or the product of the direct esterification reaction, as the case may be, is polycondensed in the presence of a polycondensation catalyst to form the desired polyester resin.

In the case of the transesterification method of preparing polyethylene terephthalate, the first stage product of the transesterification reaction is generally described as being comprised mainly of bis-2-hydroxyethyl terephthalate. Whereas the first stage product of the direct esterification method is comprised of bis-2-hydroxyethyl terephthalate along with substantial quantities of higher condensates of ethylene glycol and terephthalic acid. In particular, the product of the direct esterification reaction between ethylene glycol and terephthalic acid and the product of the transesterification reaction between dimethyl terephthalate and ethylene glycol can be described as bis-2-hydroxyethyl terephthalate or a polycondensation product thereof wherein the D.P. (degree of polymerization) varies from about 2 to about 6. However, for purposes of simplicity in describing the present invention hereinafter, the terms "polyester prepolymer" and "bis-2-hydroxyethyl terephthalate" will both denote and include within their scope the product of the direct esterification reaction between terephthalic acid and ethylene glycol and the product of the transesterification reaction between dimethyl terephthalate and ethylene glycol as set forth above.

Heretofore, various materials have been suggested as polycondensation catalysts for polycondensing the polyester prepolymer products of both the ester-interchange and direct esterification method of preparing polyester resins. However, in general, none of the substances that have been suggested as polycondensation catalysts heretofore have been completely satisfactory. For example, many of the polycondensation catalysts of the prior art only catalyze the polycondensation reaction to a low degree and they do not promote the reaction rate sufficiently to be acceptable for commercial purposes. Therefore, such polycondensation catalysts of the prior art do not act to form polyester products having carboxyl contents as low as required for some resin uses, or molecular weights and melting points as high as desired.

From a commercial standpoint, it is essential that a polyester resin be produced in the shortest possible time and the desired degree of polymerization be obtained. A polyethylene terephthalate resin suitable for melt spinning should have a carboxyl content value of about below 50 equivalents per million grams (eq./$10^6$ gr. or meq./kg.), a birefringent melting point of about at least 258–260° C., and an intrinsic viscosity preferably not less than about 0.60 (as determined in a 60% phenol and 40% tetrachloroethane mixture, wt./wt., at 30° C.), in order for the filaments formed therefrom to possess a satisfactory level of hydrolytic stability, thermal stability, ultra-violet light stability and a high degree of tenacity which is necessary for the use of such filaments in the manufacture of fibers such as is used in wash and wear clothing. It is desirable to manufacture polyester resins which have carboxyl contents as close to zero as possible, because there is a generally recognized direct relationship between the carboxyl content of the polyester resin and the hydrolytic, thermal, and ultra-violet light stability of the filaments and films produced therefrom. In general, the higher the carboxyl content of the polyester resin, the less hydrolytic, thermal, and ultra-violet light stability is possessed by the resulting films or filaments.

It is an object of the present invention to prepare highly polymeric linear polyesters by a direct esterification reaction between a dicarboxylic acid and a diol or by an ester-interchange reaction between an ester of a dicarboxylic acid and a diol, and to polycondense the resulting product of the direct esterification reaction or the resulting product of the ester-interchange reaction in the presence of an improved polycondensation catalyst.

It is another object of this invention to prepare a highly polymeric linear polyester by polycondensing bis-2-hydroxyethyl terephthalate in the presence of an improved polycondensation catalyst.

These and other objects are accomplished in accordance with the present invention which involves a method for preparing highly polymeric linear polyesters wherein dimethyl terephthalate is reacted with ethylene glycol in the presence of an ester-interchange catalyst to form a polyester prepolymer or where terephthalic acid is reacted with ethylene glycol in the presence of a first stage catalytic additive to form a polyester prepolymer and where the resulting polyester prepolymer is polycondensed in the presence of a polycondensation catalyst, the improvement comprising carrying out the polycondensation of the polyester prepolymer in the presence of a catalytic amount of a polycondensation catalyst having the formula

in which X represents an oxygen atom or a sulfur atom and $R_1$, $R_2$, and $R_3$ represent radicals selected from the group consisting of lower alkyl having one to six carbon atoms, aryl, alkaryl, and aralkyl. $R_1$, $R_2$, and $R_3$ may be the same or different.

The preparation of polyesters via the ester-interchange reaction is generally carried out with a molar ratio of glycol, such as ethylene glycol, to a dialkyl terephthalate, such as dimethyl terephthalate, of from about 1:1 to about 15:1, respectively, but preferably from about 1.5:1 to about 2.6:1. The transesterification reaction is generally carried out at atmospheric pressure in an inert atmosphere such as nitrogen, initially at a temperature range of from about 125° C. to about 250° C. but preferably between about 150° C. and 200° C. in the presence of a transesterification catalyst. During the first stage of this reaction, methyl alcohol is evolved and is continuously removed by distillation. After a reaction period of about 1 to 2 hours, the temperature of the reaction mixture is raised to from about 200° to about 300° C. for approximately one to three hours in order to complete the reaction so as to form the desired polyester prepolymer and distill off excess glycol which has been produced.

Any known suitable transesterification or ester-interchange catalyst, for example, lithium hydride or zinc acetate, can be used to catalyze the present transesterification reaction. Generally, the transesterification catalyst is used in concentrations of from about 0.01% to about 0.20%, based on the weight of the dialkyl terephthalate used in the initial reaction mixture.

Similarly, the preparation of polyester resins via the direct esterification reaction is generally carried out with a molar ratio of a glycol, such as ethylene glycol, to a dicarboxylic acid, such as terephthalic acid, of from about 1:1 to about 15:1, but preferably about 1.5:1 to about 2.6:1. The direct esterification step is generally carried out at temperatures ranging from about 180° C. to about 280° C. in the absence of an oxygen containing atmosphere at atmospheric or elevated pressure for about two to four hours to form the desired polyester prepolymer. For example, the reaction may be carried out in an atmosphere of nitrogen.

Any known suitable first stage direct esterification catalytic additive may be used in the direct esterification step of the present method. For example, calcium acetate may be used. The first stage catalytic additives are generally used at concentrations ranging from $5 \times 10^{-5}$ mole to about $5 \times 10^{-2}$ mole of catalytic additive per mole of terephthalic acid in the reaction mixture.

The polycondensation step of the present invention is accomplished by adding an organo-antimony oxide or organo-antimony sulfide compound of the present method to a polyester prepolymer or bis-2-hydroxyethyl terephthalate and heating the blend thereof under reduced pressure within the range of from about 0.05 mm. to 20 mm. of mercury while being agitated at a temperature of from about 260° C. to about 325° C. for from two to four hours.

The organo-antimony oxide and sulfide polycondensation catalysts of the present method may be suitably varied to meet any requirements of reaction conditions and desired product. Therefore, the present method is not to be limited to any particular suitable orango-antimony oxides or sulfides. For example, among the polycondensation catalysts that can be used in accordance with the present invention are triethyl antimony oxide, trimethyl antimony sulfide, tributyl antimony oxide, dimethylethyl antimony sulfide, triphenyl antimony oxide, triphenyl antimony sulfide, tribenzyl antimony oxide, methyl diphenyl antimony sulfide, dimethyltolyl antimony oxide, butylditolyl antimony sulfide, dimethyl phenyl antimony oxide, or ethyl diphenyl antimony oxide or any combination thereof. The polycondensation catalyst of the present method can be added to the reaction mixture before initiating the ester-interchange reaction or direct esterification reaction, as the case may be, or after the product thereof is formed.

The polycondensation catalysts of the present invention are generally employed in amounts ranging from about 0.01% to about 0.2%, based on the weight of the polyster prepolymer to be polycondensed. Usually, it has been found that from about 0.01% to about 0.1% of the subject polycondensation catalyst is preferred in most instances. Higher or lower concentrations of the present polycondensation catalysts can also be used in the subject polycondensation reaction. However, when concentrations less than the above are used, their effectiveness is generally reduced, whereas if concentrations greater than this are used, no further improvement in the present method or desired product is generally obtained.

The following examples of several preferred embodiments of the present invention will further serve to illustrate the present invention. All parts are by weight unless otherwise indicated.

EXAMPLE I

A blended mixture containing 474 grams of terephthalic acid, 288 mls. of ethylene glycol and 149 mls. of triethylamine was charged into a reaction vessel equipped with a nitrogen inlet, a Dean-Starke type moisture separation apparatus, heating means, and stirring means. The reaction mixture was agitated and the temperature was raised to about 197° C. under a nitrogen blanket at atmospheric pressure. At about 190° C., a water-triethylamine azeotropic mixture started to distill off. The azeotropic mixture was continuously separated by means of the Dean-Starke apparatus and the triethylamine recovered was continuously returned to the reaction vessel. The reaction mixture was held at about 197° C. for two hours until the reaction mixture became almost clear. Then the temperature was allowed to rise to about 220° C. over a one hour period to form a polyester prepolymer. The prepolymer product was allowed to cool under an atmosphere of nitrogen.

EXAMPLE II 50 grams of the prepolymer product of Example I was mixed with 0.02 gram of triphenyl antimony oxide and placed in a reaction vessel. The reaction mixture was heated at about 280° C. under reduced pressure of from about 0.05 to about 0.1 mm. of mercury while under agitation for about three hours to bring about the polycondensation of the prepolymer and formation of a polyester resin product. The polyester product had an intrinsic viscosity of 0.77, a carboxyl content value of 7.5 (meq./kg.) and a melting point of about 264° C.

EXAMPLE III 50 grams of the prepolymer product of Example I was mixed with 0.20 gram of triphenyl antimony sulfide and placed in a reaction vessel. The reaction mixture was heated at about 280° C. under reduced pressure from about 0.05 to about 0.1 mm. of mercury while under agitation for about three hours to bring about the polycondensation of the prepolymer and formation of a polyester resin product. The polyester product had an intrinsic viscosity of 0.69, a carboxyl content value of 11.9 (meq./kg.) and a melting point of about 264° C.

EXAMPLE IV

A mixture consisting of 600 grams of dimethyl terephthalate, 396 mls. of ethylene glycol and 0.24 gram of lithium hydride was charged into a reaction vessel equipped with a nitrogen inlet, a distilling arm, heating means, and stirring means. The reaction mixture was agitated and heated at atmospheric pressure to about 198° C. under a nitrogen blanket. The reaction mixture was held at about 198° C. for about two hours during which time by-product methyl alcohol was distilled off. Then the temperature of the reaction mixture was allowed to rise to 230° C. over a period of about one hour to distill off any remaining by-product comprising methyl alcohol and ethylene glycol and to form the polyester prepolymer. The prepolymer product was allowed to cool under an atmosphere of nitrogen.

EXAMPLE V 50 grams of the prepolymer product of Example IV was mixed with 0.02 gram of triphenyl antimony oxide and placed in a reaction vessel. The reaction mixture was heated at about 280° C. under reduced pressure from about 0.05 to about 0.1 mm. of mercury while under agitation for about three hours to bring about the polycondensation of the prepolymer and formation of a polyester resin product. The polyester product had an intrinsic viscosity of 0.64, a carboxyl content value of 8.1 (meq./kg.) and a melting point of about 262° C.

EXAMPLE VI 50 grams of the prepolymer product of Example IV was mixed with 0.02 gram of triphenyl antimony sulfide and placed in a reaction vessel. The reaction mixture was heated at about 280° C. under reduced pressure from about 0.05 to about 0.1 mm. of mercury while under agitation for about three hours to bring about the polycondensation of the prepolymer and formation of a polyester resin product. The polyester product had an intrinsic viscosity of 0.61, a carboxyl content value of 4.5 (meq./kg.) and a melting point of 263° C.

The intrinsic viscosity of the polymeric polyester resin products of the invention were measured in a 60% phenol and 40% tetrachloroethane mixture (wt./wt.) at 30° C.

The process of the present invention has been described with particular reference to polyethylene terephthalate, but it will be understood that the invention includes within its scope other polymeric polymethylene terephthalates formed from glycols of the series $HO(CH_2)_nOH$, where $n$ is 2 to 10 and terephthalic acid and copolyesters containing varied amounts of other suitable dicarboxylic acids such as isophthalic acid.

The results in the above examples indicate that the subject organo-antimony oxides and sulfides of the present invention, in general, facilitate the preparation of and enhance the polyester products produced. Through the use of such polycondensation catalysts, polyester products are obtained which are characterized by very low carboxyl content values and high molecular weights as indicated by the intrinsic viscosity of such products. Further, the polyester products of the present method have desirably high melting points. The combination of these properties indicates that the present invention provides an improved method for producing polyester resins that are of particular value in the production of polyester fibers.

We claim:

1. In a process of preparing polyethylene terephthalate wherein dimethyl terephthalate is reacted with ethylene glycol in the presence of an ester-interchange catalyst to form a polyester prepolymer or where terephthalic acid is reacted with ethylene glycol in the presence of a first stage catalytic additive to form a polyester prepolymer and where the resulting polyester prepolymer is polycondensed in the presence of a polycondensation catalyst, the improvement comprising carrying out the polycondensation of the polyester prepolymer in the presence of a catalytic amount of a polycondensation catalyst having the formula

in which X represents an oxygen atom or a sulphur atom and $R_1$, $R_2$, and $R_3$ represent a radical selected from the group consisting of lower alkyl having one to six carbon atoms, aryl, alkaryl, and aralkyl.

2. The method of claim 1 wherein the polycondensation catalyst is triphenyl antimony oxide.

3. The process of claim 1 wherein the polycondensation catalyst is triphenyl antimony sulfide.

4. The process of claim 1 wherein the polycondensation catalyst is present in an amount of from about 0.01% to about 0.2% based on the weight of polyester prepolymer.

5. A process of preparing a highly polymeric linear polyester which comprises the step of polycondensing bis-2-hydroxyethyl terephthalate in the presence of a polycondensation catalyst having the formula

in which X represents an oxygen atom or a sulfur atom and $R_1$, $R_2$, and $R_3$ represent a radical selected from the group consisting of lower alkyl having one to six carbon atoms, aryl, alkaryl, and aralkyl.

6. The process of claim 5 wherein the polycondensation catalyst is triphenyl antimony oxide.

7. The process of claim 5 wherein the polycondensation catalyst is triphenyl antimony sulfide.

8. The process of claim 6 wherein the polycondensation catalyst is present in an amount of from about 0.01% to about 0.2%, based on the weight of bis-2-hydroxyethyl terephthalate.

9. The process of claim 7 wherein the polycondensation catalyst is present in an amount of from about 0.01% to about 0.2%, based on the weight of bis-2-hydroxyethyl terephthalate.

References Cited

UNITED STATES PATENTS 2,913,428  11/1959  Schoepfle et al. _____ 260—75
3,055,870   9/1962  McIntyre _____ 260—75

WILLIAM H. SHORT, *Primary Examiner.*

L. P. QUAST, *Assistant Examiner.*